(12) United States Patent
Qiu et al.

(10) Patent No.: US 10,101,160 B2
(45) Date of Patent: Oct. 16, 2018

(54) RFOG WITH LOW CHROMATIC DISPERSION

(71) Applicant: Honeywell International Inc., Morristown, NJ (US)

(72) Inventors: Tiequn Qiu, Glendale, AZ (US); Glen A. Sanders, Scottsdale, AZ (US); Lee K. Strandjord, Tonka Bay, MN (US)

(73) Assignee: Honeywell International Inc., Morris Plains, NJ (US)

( * ) Notice: Subject to any disclaimer, the term of this patent is extended or adjusted under 35 U.S.C. 154(b) by 259 days.

(21) Appl. No.: 13/937,956

(22) Filed: Jul. 9, 2013

(65) Prior Publication Data

US 2015/0015892 A1    Jan. 15, 2015

(51) Int. Cl.
*G01C 19/72* (2006.01)
*G02B 6/293* (2006.01)
*G02B 6/02* (2006.01)

(52) U.S. Cl.
CPC ........... *G01C 19/727* (2013.01); *G01C 19/72* (2013.01); *G02B 6/29376* (2013.01); *G02B 6/02233* (2013.01)

(58) Field of Classification Search
CPC ........ G01C 19/72; G01C 19/727; G02B 6/22; G02B 6/36; G02B 6/29376; G02B 6/02233
USPC .......................................... 356/461; 385/123
See application file for complete search history.

(56) References Cited

U.S. PATENT DOCUMENTS

| | | | |
|---|---|---|---|
| 5,361,319 A * | 11/1994 | Antos et al. | 385/123 |
| 6,243,167 B1 | 6/2001 | Bouamra | |
| 6,404,956 B1 | 6/2002 | Brennan, III et al. | |
| 7,777,889 B2 | 8/2010 | Qiu | |
| 2002/0003938 A1 | 1/2002 | Srikant | |
| 2007/0242276 A1* | 10/2007 | Hughes et al. | 356/461 |

(Continued)

FOREIGN PATENT DOCUMENTS

EP    1246380    10/2002

OTHER PUBLICATIONS

European Patent Office, "Extended European Search Report from EP Application No. 14173567.0 dated Nov. 10, 2014", Nov. 10, 2014, pp. 1-9, Published in: EP.

(Continued)

*Primary Examiner* — Jamil Ahmed
(74) *Attorney, Agent, or Firm* — Fogg & Powers LLC

(57) ABSTRACT

One embodiment is directed towards a resonator fiber optic gyroscope (RFOG) including a resonator, one or more light sources coupled to the resonator, and resonance tracking electronics coupled to the resonator. The one or more light sources are configured to produce at least two light beams for input into the fiber coil, the at least two light beams including a first light beam at a first frequency and a second light beam at a second frequency, the first and second frequencies locked to nearby resonance modes of the resonator. The resonance tracking electronics are configured to process output light from the resonator and generate a signal therefrom, the signal indicative of a rotation rate of the resonator. The fiber coil has approximately zero total accumulated chromatic dispersion at the first frequency and the second frequency of the first light beam and the second light beam.

18 Claims, 6 Drawing Sheets

(56) References Cited

U.S. PATENT DOCUMENTS

2013/0107271 A1    5/2013  Strandjord et al.

OTHER PUBLICATIONS

Reeves et al., "Demonstration of ultra-flattened dispersion in photonic crystal fibers", "Optics Express", Jul. 15, 2002, pp. 609-613, vol. 10, No. 14.
Yao, "What is Chromatic Dispersion in Optical Fibers", "retrieved online from http://www.youtube.com/watch?v=PWaNMjimtP0", Dec. 13, 2011, pp. 1-3.
European Patent Office, "Office Action from EP Application No. 14173567.0 dated Nov. 14, 2016", "from Foreign Counterpart of U.S. Appl. No. 13/937,956", dated Nov. 14, 2016, pp. 1-4, Published in: EP.

\* cited by examiner

RFOG WITH LOW CHROMATIC DISPERSION

BACKGROUND

A resonator fiber optic gyroscope (RFOG) has the potential to be a rotation rate sensing device with high accuracy in a compact size. To avoid back-reflected light from interfering with signal light, multiple frequency light sources with different carrier frequencies have been proposed to measure the resonance frequency difference between the clockwise (CW) and counter-clockwise (CCW) direction. This uses two or more light beams locked to neighboring resonances to calculate the rotation rate.

SUMMARY

One embodiment is directed towards a resonator fiber optic gyroscope (RFOG) including a resonator, one or more light sources coupled to the resonator, and resonance tracking electronics coupled to the resonator. The one or more light sources are configured to produce at least two light beams for input into the fiber coil, the at least two light beams including a first light beam at a first frequency and a second light beam at a second frequency, the first and second frequencies locked to nearby resonance modes of the resonator. The resonance tracking electronics are configured to process output light from the resonator and generate a signal therefrom, the signal indicative of a rotation rate of the resonator. The fiber coil has approximately zero total accumulated chromatic dispersion at the first frequency and the second frequency of the first light beam and the second light beam.

DRAWINGS

Embodiments of the present invention can be more easily understood and further advantages and uses thereof more readily apparent, when considered in view of the description of the preferred embodiments and the following figures.

In accordance with common practice, the various described features are not drawn to scale but are drawn to emphasize features relevant to the present invention. Reference characters denote like elements throughout figures and text.

DETAILED DESCRIPTION

When two or more lasers locked to different longitudinal resonances are used to measure rotation rate in the RFOG, fiber chromatic dispersion can adversely affect the measured rotation rate. Careful analysis shows that, unless countermeasures are implemented, use of a measurement of the resonance frequency difference between the CW and CCW directions to compute rotation rate can produce a bias error due to chromatic dispersion of the fiber in the resonator. Embodiments described herein provide methods and apparatuses for an RFOG having reduced chromatic dispersion such that the bias error due to chromatic dispersion is reduced.

Figure 1:
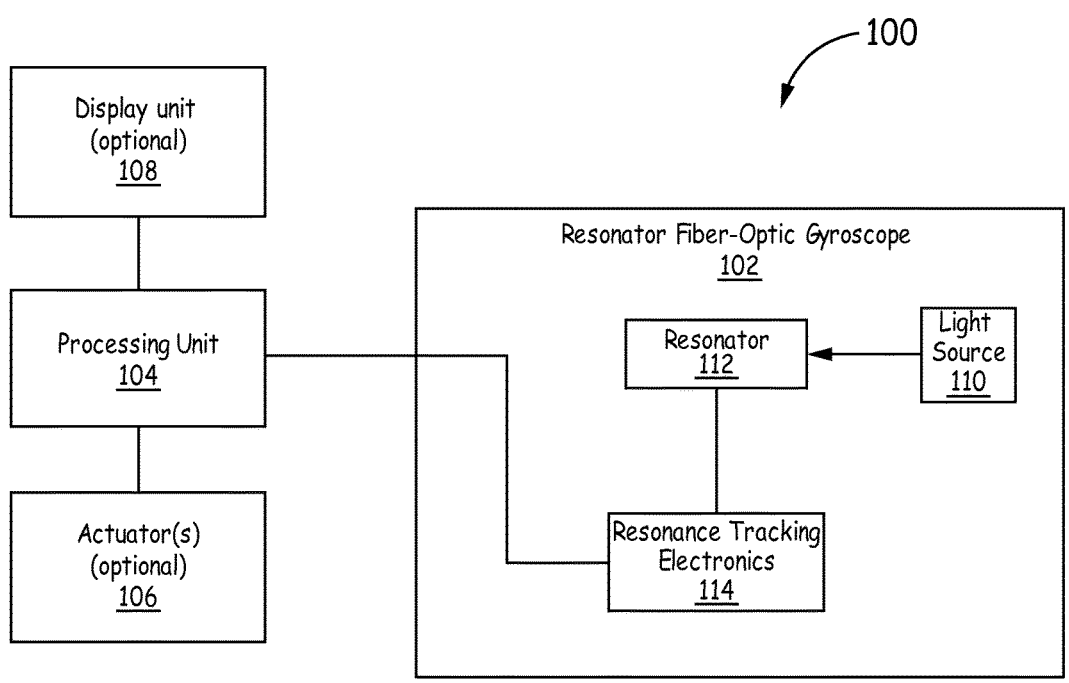
FIG. 1 is a block diagram of one embodiment of a system utilizing an RFOG that has reduced chromatic dispersion.

FIG. 1 is a block diagram of one embodiment of a system 100 utilizing an RFOG 102 that has reduced chromatic dispersion. The system 100 is a navigation system in this embodiment. However, it should be understood that, in other embodiments, RFOG 102 can be used in other systems, such as but not limited to, a platform stabilization system or a pointing system. For example, in some embodiments, the RFOG 102 is implemented as part of an inertial sensor unit that includes one or more RFOGs and one or more linear accelerometers. The RFOG 102 measures rotation rate and outputs a signal indicative of rotation rate to a processing unit 104. The processing unit 104 uses the signal indicative of rotation rate from the RFOG 102 to calculate parameters such as position, orientation, and angular velocity.

The processing unit 104 uses the calculated parameters, in some embodiments, to calculate control signals that are outputted to one or more optional actuators 106. In some embodiments, the navigation system 100 is implemented in an unmanned vehicle. Hence, the actuators 106 are implemented according to vehicle type. For example, in an unmanned aerial vehicle, the actuators 106 can be implemented as wing flaps, thrusters, etc.

In some embodiments, the processing unit 104 outputs the calculated parameters to an optional display unit 108. The display unit 108 can display the geographic location, velocity, and/or orientation (e.g., pitch, roll, and/or yaw) of a vehicle in which the RFOG 102 is located. The display unit 108 can be implemented as any suitable display unit such as, but not limited to, various CRT, active and passive matrix LCD, and plasma display units.

In an example, the RFOG 102 includes one or more light sources 110 coupled to a resonator and configured to generate at least two light beams for input into the resonator 112. The RFOG 102 also includes resonance tracking electronics 114 coupled to an output of the resonator 112. The resonance tracking electronics 114 generate a signal indicative of a rotation rate of the resonator 112. It should be understood that the manner of generating the signal indicative of a rotation rate described herein in merely exemplary and that other manners of generating the signal can be used.

Figure 2:
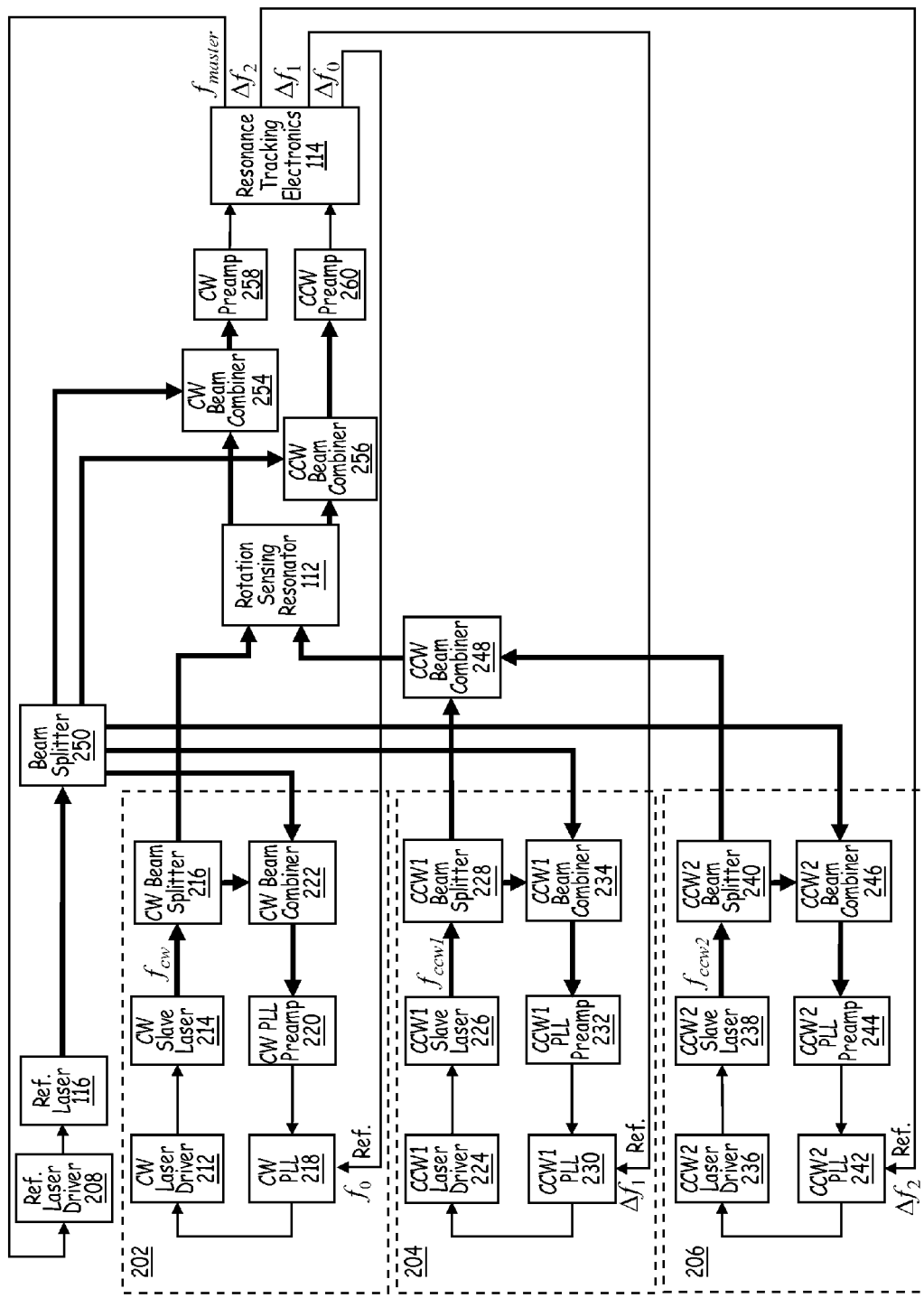
FIG. 2 is a block diagram of one embodiment of the RFOG of the system of FIG. 1.

FIG. 2 is a block diagram of one embodiment of an RFOG 102. The RFOG 102 includes one or more light sources 110 to produce at least two light beams for input into the resonator 112. The example shown in FIG. 2 includes an RFOG 102 configured for three light beams for input into the resonator 112; however, in other examples the RFOG 102 can be configured for two light beams input into the resonator 112, or for more than three light beams for input into the resonator 112. In the example shown in FIG. 2, the one or more light sources 110 produce a reference light beam, a first light beam, a second light beam, and a third light beam. In the example shown in FIG. 2, the one or more light sources 110 include a reference laser source 116, a first laser source 202, a second laser source 204, and a third laser source 206 which generate their respective light beams. In other examples, the one or more light sources can include a reference laser source to generate the reference laser beam and optical frequency shifters to produce one or more of the first, second, and third laser beams from the reference laser beam. Combinations of laser sources and optical frequency shifters can also be used to produce the at least two light beams.

In the example shown in FIG. 2, the reference laser source 116 generates a reference light beam with a constant frequency, $f_{ref}$, that a series of beam splitters 250 splits into four beams. A first beam goes to the CW beam combiner 222, a second beam goes to the first CCW (CCW1) beam combiner 234, a third beam goes to a second CCW (CCW2) beam combiner 246, and a fourth beam goes to a CW beam combiner 252.

The first laser source 202 generates a first light beam that is coupled into a first input of the resonator 112 to propagate therethrough in a clockwise (CW) direction. In this embodiment, the first laser source 202 comprises a CW laser driver 212, a CW slave laser 214, a CW beam combiner 222, a CW phase-lock-loop (PLL) preamp 220, and a CW phase-lock-loop (PLL) 218. The CW beam splitter 216 splits the CW slave light beam (first light beam) into two beams. One light beam propagates from the first laser source 202 as the first light beam and propagates through the rotation-sensing resonator 112 in a clockwise direction. The other laser beam goes to a CW beam combiner 222. CW beam combiner 222 optically mixes the reference light beam with the other light beam from the CW beam splitter 216. The optical mixing creates an intensity signal at the output of the CW beam combiner 222. The frequency of the intensity signal contains the beat frequency between the CW light beam and the reference light beam. The CW PLL preamp 220 converts this intensity signal into an electrical signal. The CW PLL 218 locks the frequency of the CW slave laser 214 to the reference light beam with an additional CW frequency offset, $\Delta f_0$, provided as a reference signal. The resonance tracking electronics 114 generate electronically, the CW frequency offset, $\Delta f_0$. The CW PLL 218 controls the CW laser frequency via the CW laser driver 212 in a feedback loop to maintain the beat signal frequency of the CW frequency offset, $\Delta f_0$, between the CW slave laser 214 and the reference laser 116.

A second laser source 204 generates a second light beam that is coupled into a second input of the resonator 112 to propagate therethrough in a counter-clockwise (CCW) direction. A third laser source 206 generates a third light beam that is coupled into the second input of the resonator 112 to propagate therethrough in a counter-clockwise (CCW) direction. The second laser source 204 and third laser source 206 are configured similarly to the first laser source 202. Both the second laser source 204 and the third laser source 206 use a phase lock loop (e.g., a CCW1 PLL 230 and a CCW2 PLL 242) to lock the respective laser sources to a frequency offset from the reference laser 116. Likewise, the resonance tracking electronics 114 generate electronically the frequency offsets. In the case of a CCW1 slave laser 226, the frequency offset is $\Delta f_1$ and for a CCW2 slave laser 238 the frequency offset is $\Delta f_2$. The frequency of the CCW1 slave laser 226 is set to at least one free spectral range of the resonator below the frequency of the CW slave laser 214. The frequency of the CCW2 slave laser 226 is set to at least one free spectral range of the resonator above the frequency of the CW slave laser 214. Thus, the first (CW), second (CCW1), and third (CCW2) light beams are locked to different, but nearby, resonance modes of the resonator 112. A CW beam combiner 252 combines the beams of reference laser 116 and CW slave laser 214 to produce a combined input light beam. The combined input light beam output of the CW combiner 252 propagates through the resonator 112 in the clockwise direction. A CCW beam combiner 248 combines the beams of CCW1 slave laser 226 and CCW2 slave laser 238 to produce a combined input light beam. The combined input light beam output of the CCW beam combiner 248 propagates through the rotation-sensing resonator 112 in the counter-clockwise direction.

The reference laser beam is locked to the resonator using the Pound-Drever-Hall (PDH) technique implemented in part by loop electronics 256 that receives signals from the CW reflection port preamp 254 of the resonator. Preamp 254 is connected to a photodetector (not shown) that receives light from the reflection port of the resonator in the CW direction. The first light beam, second light beam, and third light beam are locked onto respective resonance frequencies of the resonator 112 using their PLL and the feedback from the resonance tracking electronics 114. To determine the center of their respective resonance frequencies, the first light beam, second light beam, and third light beam are modulated using a resonance tracking modulation frequency. Any appropriate modulation can be used including common-cavity modulation or Pound-Drever-Hall (PDH) based modulation.

Figure 3:
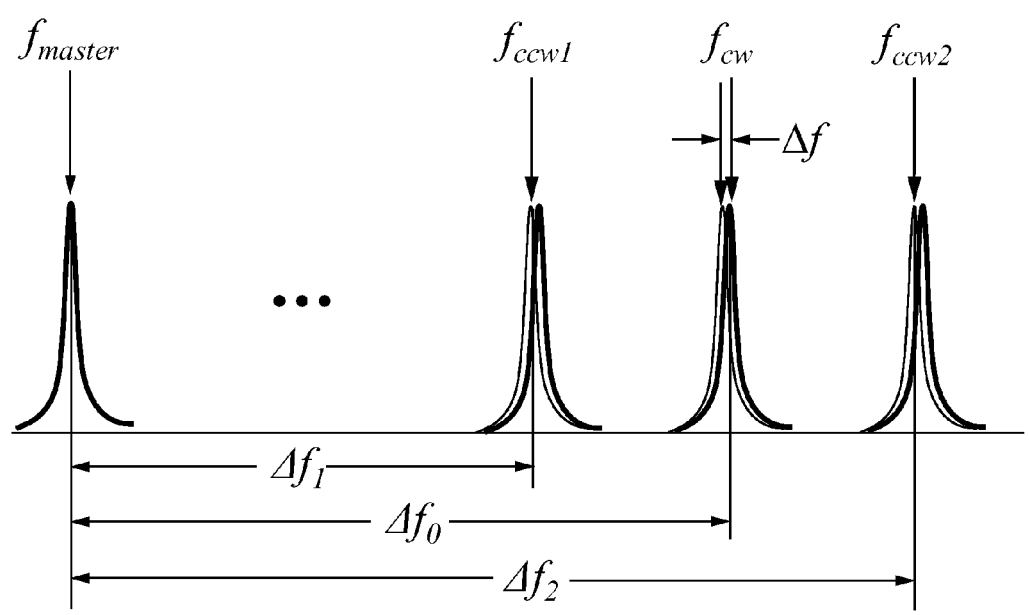
FIG. 3 is a graph illustrating one embodiment of the frequency relationship between lasers in the RFOG of FIG. 2.

The frequency relationship of the lasers can be illustrated in FIG. 3. Without taking into account the dispersion of the fiber, the frequency difference between CW and CCW resonance can be expressed as $\Delta f = f_{CW} - (f_{CCW2} + f_{CCW1})/2 = \Delta f_0 - (\Delta f_2 + \Delta f_1)/2$. When fiber dispersion is taken into account, frequency difference becomes $$\Delta f = f_{CW} - \frac{f_{CCW1} + f_{CCW2}}{2} - \frac{\pi \beta_2}{2 \beta_1}[(f_{CCW2} - f_{CW})^2 + (f_{CCW1} - f_{CW})^2]$$

$$= \Delta f_0 - \frac{\Delta f_1 + \Delta f_2}{2} - \frac{\pi \beta_2}{2 \beta_1}[(\Delta f_2 - \Delta f_0)^2 + (\Delta f_1 - \Delta f_0)^2],$$

where $\beta_1$ and $\beta_2$ are the first and second order coefficients in the Taylor series expansion of the propagation constant $\beta(\omega)$, $$\beta(f) = \beta_0 + \beta_1(\omega - \omega_0) + \frac{1}{2}\beta_2(\omega - \omega_0)^2 + \ldots$$

$$= \beta_0 + \frac{d\beta}{d\omega}(\omega - \omega_0) + \frac{1}{2}\frac{d^2\beta}{d\omega^2}(\omega - \omega_0)^2 + \ldots .$$

The frequency difference now contains an error term that is proportional to the dispersion parameter of fiber, $\beta_2$, and the quadratic of frequency separation between the lasers, which are automatically tuned to the cavity resonances. When frequency separation is larger, the dispersion induced bias can be significant.

Figure 4:
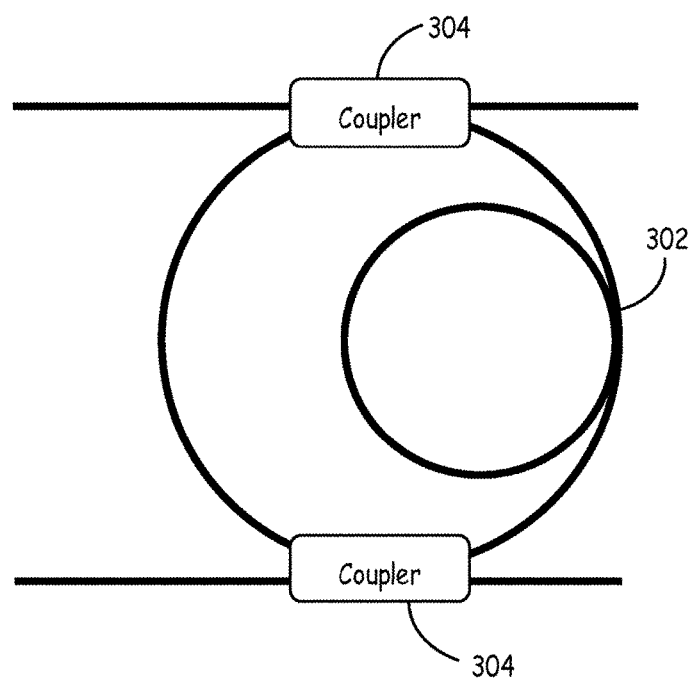
FIG. 4 is a block diagram of one embodiment of a resonator from the RFOG of FIG. 2.

FIG. 4 is a block diagram of one embodiment of the resonator 112. The resonator 112 includes a fiber coil 302 coupled to one or more coupling devices 304. The one or more coupling devices 304 are configured to direct a portion of light from a first end of the fiber coil 302 into a second end of the fiber coil 302, and to direct a portion of light from a second end of the fiber coil 302 into a first end of the fiber coil 302. The one or more coupling devices can include one or more partially reflective mirrors or other light directing structure.

The fiber coil 302 comprises a single spatial mode optical fiber configured into a coil. The fiber 302 can comprise either a solid core fiber or a hollow core fiber. The fiber coil 302 is composed of one or more optical materials such that the total accumulated chromatic dispersion of the fiber coil 302 is approximately zero at the frequencies of the at least two light beams that are input into the resonator 112. As discussed above, the at least two light beams are generated by the one or more light sources 110 and can include two, three, or more light beams. The at least two light beams have respective frequencies that are locked to nearby resonance modes of the resonator 112. For example, the frequency of the CCW1 slave laser 226 in the example discussed above is set to at least one free spectral range below the frequency of the CW slave laser 214. The frequency of the CCW2 slave laser 238 is set to at least one free spectral range above the frequency of the CW slave laser 214.

Since the frequencies of the at least two light beams are locked to nearby resonance modes, the frequencies of the at least two light beams are close to one another. In an example, the frequencies of the at least two light beams are within a frequency range of 1 to 100 MHz. In an example, the at least two light beams have a frequency around 1550 nm; however, other frequencies can also be used.

In any case, the one or more materials for the fiber coil 302 can be selected such that the fiber coil 302 has approximately zero total accumulated optical pathlength change from chromatic dispersion at the frequencies (e.g., within the frequency range) of the at least two light beams. The total accumulated optical pathlength change from dispersion (also referred to herein as the "total accumulated dispersion" or "total accumulated chromatic dispersion") refers to the amount of optical pathlength change due to chromatic dispersion experienced by a light beam traveling from the first end of the fiber coil 302 through the fiber coil 302 and out of the second end of the fiber coil 302.

In the example illustrated in FIG. 4, the fiber coil 302 has a substantially constant chromatic dispersion throughout the fiber coil 302, wherein the substantially constant chromatic dispersion is approximately zero at the frequencies of the at least two light beams. That is, at any location along the fiber coil 302, the chromatic dispersion at the frequencies of the at least two light beams is approximately zero. An optical fiber having such properties can be a dispersion shifted fiber (DSF) used in the communication industry.

Figure 5:
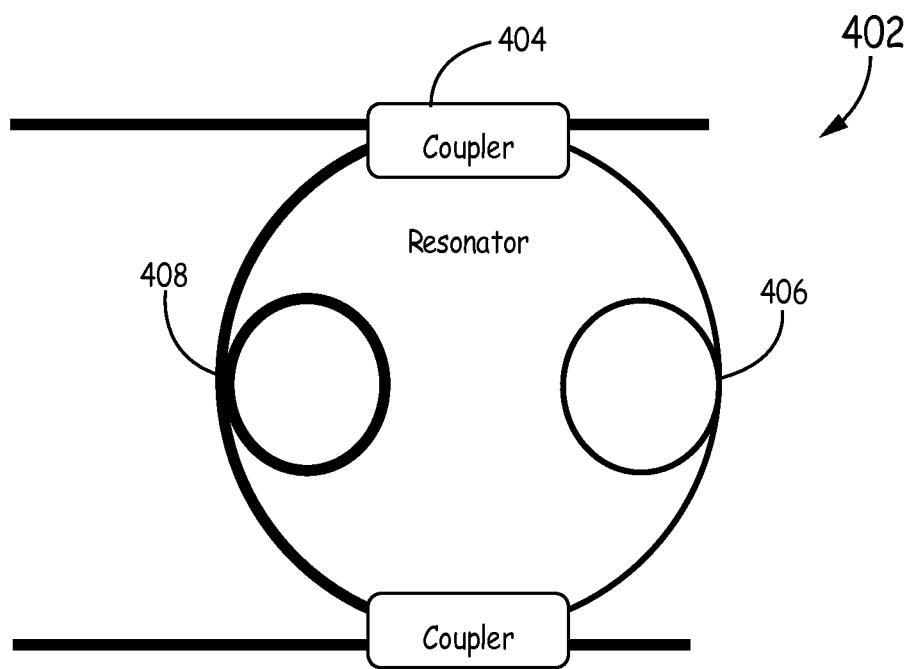
FIG. 5 is a block diagram of another embodiment of a resonator from the RFOG of FIG. 2.

FIG. 5 is a block diagram of another example resonator 112. The resonator 112 illustrated in FIG. 5 includes a fiber coil 402 coupled to one or more coupling devices 404. The one or more coupling devices 404 are configured to direct a portion of light from a first end of the fiber coil 402 into a second end of the fiber coil 402, and to direct a portion of light from a second end of the fiber coil 402 into a first end of the fiber coil 402. The one or more coupling devices can include one or more partially reflective mirrors, 2×2 fiber optic couplers, or other light directing components.

Similar to fiber coil 302, the fiber coil 402 comprises a single spatial mode fiber configured into a coil, and can comprise either a solid core fiber or a hollow core fiber. The fiber coil 402 is also composed of one or more types of fibers such that the total accumulated chromatic dispersion of the fiber coil 402 is approximately zero at the frequencies of the at least two light beams that are input into the resonator 112. Instead of having a substantially constant chromatic dispersion throughout, the fiber coil 402 is composed of multiple fiber portions 406, 408, each fiber portion 406, 408 having a different chromatic dispersion at the at least two frequencies, wherein the combination of the chromatic dispersions of all the fiber portions 406, 408 equals approximately zero accumulated chromatic dispersion at the at least two frequencies, such that the fiber coil 402 has substantially zero total accumulated chromatic dispersion at the at least two frequencies. As mentioned above, the total accumulated chromatic dispersion refers to the amount of chromatic dispersion experienced by a light beam traveling from the first end of the fiber coil 402 through each of the fiber portions 406, 408 of the fiber coil 402, and out of the second end of the fiber coil 402.

Figure 6:
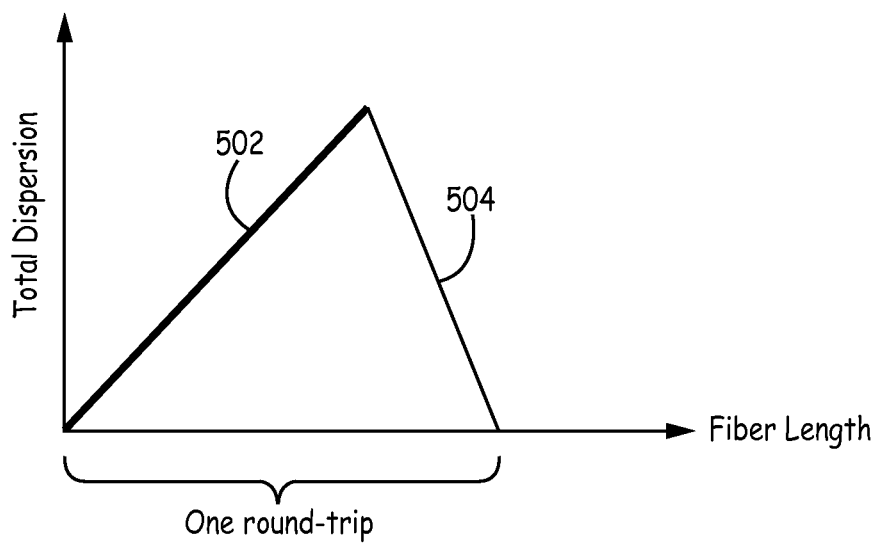
FIG. 6 is a graph illustrating one embodiment of the chromatic dispersion of a fiber coil in the resonator of FIG. 5.

In the example illustrated in FIG. 5, the fiber coil 402 is composed of two fiber portions 406, 408. One of the fiber portions 406 has a positive chromatic dispersion at the at least two frequencies and the other fiber portion 408 has a negative chromatic dispersion at the at least two frequencies. The length of the fiber portions 406, 408 is individually selected such that the total chromatic dispersion of one fiber portion 406 is equal to, with an opposite sign of, the total chromatic dispersion of the other fiber portion 408. FIG. 6 is a graph illustrating the chromatic dispersion of the two fiber portions 406, 408 cancelling out to approximately zero total accumulated chromatic dispersion. A first line 502 corresponds to the positive chromatic dispersion of fiber portion 406 and a second line 504 corresponds to the negative chromatic dispersion of fiber portion 408. Accordingly, the total chromatic dispersion for the fiber coil 402 is approximately zero at the at least two frequencies of the light beams input into the fiber coil 402.

In other examples, the fiber coil 402 can have more than two fiber portions, and a given fiber portion can have a positive, negative, or zero chromatic dispersion. Similar to the example shown in FIG. 5, however, in such other examples, the length of each fiber portion can be individually selected such that the total chromatic dispersion of all the fiber portions is approximately zero at the at least two frequencies.

An RFOG 102 as described herein can be manufactured by selecting or otherwise providing a fiber coil 302, 402 having approximately zero total accumulated chromatic dispersion at the frequencies of the at least two light beams. One or more coupling devices 304, 404 can be coupled to the fiber coil 302, 404 in order to form a resonator 112. One or more light sources 110 can be coupled to the resonator 112 such that light from the one or more light sources 110 is input into the resonator 112. Resonance tracking electronics 114 are coupled to outputs from the resonator 112 and configured to process light from such outputs in order to generate a signal indicative of a rotation of the resonator 112.

EXAMPLE EMBODIMENTS

Example 1 includes a resonator fiber optic gyroscope (RFOG) comprising: a resonator including: a fiber coil; and one or more coupling devices configured to direct a portion of light from a first end of the fiber coil into a second end of the fiber coil and a portion of light from the second end of the fiber coil into the first end of the fiber coil; one or more light sources coupled to the resonator and configured to produce at least two light beams for input into the fiber coil, the at least two light beams including a first light beam at a first frequency and a second light beam at a second frequency, the first and second frequencies locked to nearby resonance modes of the resonator; and resonance tracking electronics coupled to the resonator and configured to process output light from the resonator and generate a signal therefrom, the signal indicative of a rotation rate of the resonator; wherein the fiber coil has approximately zero total accumulated chromatic dispersion at the first frequency and the second frequency of the first light beam and the second light beam.

Example 2 includes the RFOG of Example 1, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

Example 3 includes the RFOG of Example 2, wherein the first light beam propagates in a first direction through the resonator and a second and third light beams propagate in a second direction through the resonator.

Example 4 includes the RFOG of any of Examples 1-3, wherein the fiber coil has a substantially constant zero dispersion at the first and second frequencies throughout the fiber coil.

Example 5 includes the RFOG of any of Examples 1-3, wherein the fiber coil includes a first fiber portion having a positive chromatic dispersion at the first and second frequencies and a second fiber portion having a negative chromatic dispersion at the first and second frequencies, wherein the positive and negative chromatic dispersions cancel out to yield the approximately zero total accumulated chromatic dispersion for the fiber coil.

Example 6 includes the RFOG of example 5, wherein the length of the first fiber portion of the fiber coil and the length of the second fiber portion of the fiber coil are selected such that the positive chromatic dispersion of the first fiber portion is equal to, with an opposite sign of, the negative chromatic dispersion of the second fiber portion.

Example 7 includes the RFOG of any of Examples 1-6, wherein the first light beam propagates in a first direction through the resonator and the second light beam propagates in a second direction through the resonator.

Example 8 includes the RFOG of any of Examples 1-7, wherein the fiber coil comprises a single spatial mode fiber.

Example 9 includes a method of manufacturing a resonator fiber optic gyroscope (RFOG), the method comprising: providing a fiber coil having approximately zero total accumulated chromatic dispersion at a first frequency and a second frequency; coupling one or more coupling devices to the fiber coil, the one or more coupling devices configured to direct a portion of light from a first end of the fiber coil into a second end of the fiber coil and a portion of light from the second end of the fiber coil into the first end of the fiber coil, such that the one or more coupling devices and the fiber coil form a resonator; coupling one or more light sources to the resonator such that light from the one or more light sources is configured to be input into the resonator, the one or more light sources configured to produce at least two light beams for input into the fiber coil, the at least two light beams including a first light beam at the first frequency and a second light beam at the second frequency, the first and second frequencies locked to nearby resonance modes of the resonator; and coupling resonance tracking electronics to the resonator, the resonance tracking electronics configured to process output light from the resonator and generate a signal therefrom, the signal indicative of a rotation rate of the resonator.

Example 10 includes the method of Example 9, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

Example 11 includes the method of Example 10, wherein the first light beam propagates in a first direction through the resonator and a second and third light beams propagate in a second direction through the resonator.

Example 12 includes the method of any of Examples 9-11, wherein the fiber coil has a substantially constant zero dispersion at the first and second frequencies throughout the fiber coil.

Example 13 includes the method of any of Examples 9-11, wherein the fiber coil includes a first fiber portion having a positive chromatic dispersion at the first and second frequencies and a second fiber portion having a negative chromatic dispersion at the first and second frequencies, wherein the positive and negative chromatic dispersions cancel out to yield the approximately zero total accumulated chromatic dispersion for the fiber coil.

Example 14 includes the method of Example 13, wherein the length of the first fiber portion of the fiber coil and the length of the second fiber portion of the fiber coil are selected such that the positive chromatic dispersion of the first fiber portion is equal to, with an opposite sign of, the negative chromatic dispersion of the second fiber portion.

Example 15 includes the method of any of Examples 9-14, wherein the first light beam propagates in a first direction through the resonator and the second light beam propagates in a second direction through the resonator.

Example 16 includes the method of any of Examples 9-15, wherein the fiber coil comprises a single spatial mode fiber.

Example 17 includes a resonator fiber optic gyroscope (RFOG) comprising: a light resonator including a single spatial mode fiber configured as a fiber coil; one or more light sources coupled to the resonator and configured to produce at least two light beams for input into the fiber coil, the at least two light beams including a first light beam at a first frequency and a second light beam at a second frequency, the first and second frequencies locked to adjacent resonance modes of the resonator; and resonance tracking electronics coupled to the resonator and configured to process output light from the resonator and generate a signal therefrom, the signal indicative of a rotation rate of the resonator; wherein the fiber coil has approximately zero total accumulated chromatic dispersion at the first frequency and the second frequency of the first light beam and the second light beam.

Example 18 includes the RFOG of Example 17, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

Example 19 includes the RFOG of any of Examples 17 or 18, wherein the fiber coil has a substantially constant zero dispersion at the first and second frequencies throughout the fiber coil.

Example 20 includes the RFOG of any of Examples 17 or 18, wherein the fiber coil includes a first fiber portion having a positive chromatic dispersion at the first and second frequencies and a second fiber portion having a negative chromatic dispersion at the first and second frequencies, wherein the length of the first fiber portion and the length of the second fiber portion are selected such that the positive chromatic dispersion of the first fiber portion is equal to, with an opposite sign of, the negative chromatic dispersion of the second fiber portion, such that the positive and negative chromatic dispersions cancel out to yield the approximately zero total accumulated chromatic dispersion for the fiber coil.

What is claimed is:

1. A resonator fiber optic gyroscope (RFOG) comprising:
a resonator including:
a fiber coil;
one or more coupling devices configured to direct a portion of light from a first end of the fiber coil into a second end of the fiber coil and a portion of light from the second end of the fiber coil into the first end of the fiber coil;
one or more light sources coupled to the resonator and configured to produce at least two light beams for input into the fiber coil, the at least two light beams including a first light beam at a first frequency and a second light beam at a second frequency, the first and second frequencies locked to nearby resonance modes of the resonator;
resonance tracking electronics coupled to the resonator and configured to process output light from the resonator and generate a signal therefrom, the signal indicative of a rotation rate of the resonator;
wherein the fiber coil has approximately zero total accumulated chromatic dispersion at the first frequency and the second frequency of the first light beam and the second light beam; and
wherein the fiber coil includes a first fiber portion having a positive chromatic dispersion at the first and second frequencies and a second fiber portion having a negative chromatic dispersion at the first and second frequencies, wherein the length of the first fiber portion and the length of the second fiber portion are selected such that the positive chromatic dispersion of the first fiber portion is equal to, with an opposite sign of, the negative chromatic dispersion of the second fiber portion, such that the positive and negative chromatic dispersions cancel out to yield the approximately zero total accumulated chromatic dispersion for the fiber coil.

2. The RFOG of claim 1, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

3. The RFOG of claim 2, wherein the first light beam propagates in a first direction through the resonator and a second and third light beams propagate in a second direction through the resonator.

4. The RFOG of claim 1, wherein the fiber coil has a substantially constant zero dispersion at the first and second frequencies throughout the fiber coil.

5. The RFOG of claim 1, wherein the first frequency and the second frequency are separated within a frequency range of 1 to 100 MHz.

6. The RFOG of claim 1, wherein the first light beam propagates in a first direction through the resonator and the second light beam propagates in a second direction through the resonator.

7. The RFOG of claim 1, wherein the fiber coil comprises a single spatial mode fiber.

8. A method of manufacturing a resonator fiber optic gyroscope (RFOG), the method comprising:
providing a fiber coil having approximately zero total accumulated chromatic dispersion at a first frequency and a second frequency;
coupling one or more coupling devices to the fiber coil, the one or more coupling devices configured to direct a portion of light from a first end of the fiber coil into a second end of the fiber coil and a portion of light from the second end of the fiber coil into the first end of the fiber coil, such that the one or more coupling devices and the fiber coil form a resonator;
coupling one or more light sources to the resonator such that light from the one or more light sources is configured to be input into the resonator, the one or more light sources configured to produce at least two light beams for input into the fiber coil, the at least two light beams including a first light beam at the first frequency and a second light beam at the second frequency, the first and second frequencies locked to nearby resonance modes of the resonator;
coupling resonance tracking electronics to the resonator, the resonance tracking electronics configured to process output light from the resonator and generate a signal therefrom, the signal indicative of a rotation rate of the resonator; and
wherein the fiber coil includes a first fiber portion having a positive chromatic dispersion at the first and second frequencies and a second fiber portion having a negative chromatic dispersion at the first and second frequencies, wherein the positive and negative chromatic dispersions cancel out to yield the approximately zero total accumulated chromatic dispersion for the fiber coil, and wherein the length of the first fiber portion of the fiber coil and the length of the second fiber portion of the fiber coil are selected such that the positive chromatic dispersion of the first fiber portion is equal to, with an opposite sign of, the negative chromatic dispersion of the second fiber portion.

9. The method of claim 8, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

10. The method of claim 9, wherein the first light beam propagates in a first direction through the resonator and a second and third light beams propagate in a second direction through the resonator.

11. The method of claim 8, wherein the fiber coil has a substantially constant zero dispersion at the first and second frequencies throughout the fiber coil.

12. The method of claim 8, wherein the first frequency and the second frequency are separated within a frequency range of 1 to 100 MHz.

13. The method of claim 8, wherein the first light beam propagates in a first direction through the resonator and the second light beam propagates in a second direction through the resonator.

14. The method of claim 8, wherein the fiber coil comprises a single spatial mode fiber.

15. A resonator fiber optic gyroscope (RFOG) comprising:
a light resonator including a single spatial mode fiber configured as a fiber coil;
one or more light sources coupled to the resonator and configured to produce at least two light beams for input into the fiber coil, the at least two light beams including a first light beam at a first frequency and a second light beam at a second frequency, the first and second frequencies locked to adjacent resonance modes of the resonator;
resonance tracking electronics coupled to the resonator and configured to process output light from the resonator and generate a signal therefrom, the signal indicative of a rotation rate of the resonator;

wherein the fiber coil has approximately zero total accumulated chromatic dispersion at the first frequency and the second frequency of the first light beam and the second light beam; and wherein the fiber coil includes a first fiber portion having a positive chromatic dispersion at the first and second frequencies and a second fiber portion having a negative chromatic dispersion at the first and second frequencies, wherein the length of the first fiber portion and the length of the second fiber portion are selected such that the positive chromatic dispersion of the first fiber portion is equal to, with an opposite sign of, the negative chromatic dispersion of the second fiber portion, such that the positive and negative chromatic dispersions cancel out to yield the approximately zero total accumulated chromatic dispersion for the fiber coil.

16. The RFOG of claim 15, wherein the at least two light beams comprise a third light beam at a third frequency, the third frequency locked to a resonance mode of the resonator nearby the first and second frequencies, wherein the fiber coil has approximately zero total accumulated chromatic dispersion at the first, second, and third frequencies.

17. The RFOG of claim 15, wherein the fiber coil has a substantially constant zero dispersion at the first and second frequencies throughout the fiber coil.

18. The RFOG of claim 15, wherein the first frequency and the second frequency are separated within a frequency range of 1 to 100 MHz.

\* \* \* \* \*